(12) United States Patent
Epworth et al.

(10) Patent No.: US 7,315,584 B1
(45) Date of Patent: Jan. 1, 2008

(54) COHERENT RECEIVER

(75) Inventors: Richard Epworth, Sawbridgeworth (GB); Seb Savory, Bassingbourn (GB); Robin Rickard, Spellbrook (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 629 days.

(21) Appl. No.: 10/738,494

(22) Filed: Dec. 17, 2003

(51) Int. Cl.
  *H03K 9/00* (2006.01)
(52) U.S. Cl. ........................ 375/316; 375/325
(58) Field of Classification Search ............... 375/316, 375/322, 340, 345, 325; 329/345
  See application file for complete search history.

(56) References Cited

U.S. PATENT DOCUMENTS

| | | | |
|---|---|---|---|
| 5,237,287 A * | 8/1993 | Bar-David | 329/308 |
| 5,488,240 A * | 1/1996 | Hlousek et al. | 250/231.16 |
| 5,657,318 A * | 8/1997 | Ohmori et al. | 370/516 |
| 5,850,437 A * | 12/1998 | Braams et al. | 379/386 |
| 6,606,360 B1 * | 8/2003 | Dunning et al. | 375/354 |
| 6,636,570 B1 * | 10/2003 | Choi et al. | 375/332 |
| 7,010,073 B2 * | 3/2006 | Black et al. | 375/355 |
| 2002/0118737 A1 * | 8/2002 | Thesling et al. | 375/226 |
| 2002/0135513 A1 * | 9/2002 | Paschen et al. | 342/371 |
| 2002/0154598 A1 * | 10/2002 | Furukawa et al. | 370/208 |
| 2003/0131301 A1 * | 7/2003 | Shimono et al. | 714/752 |
| 2004/0091064 A1 * | 5/2004 | Cao et al. | 375/316 |

OTHER PUBLICATIONS

S Yamashita: "Two-Branch Double-Stage Phase-Diversity (DSPD) Coherent Receiver Using a 3x3 Fiber Coupler", IEEE Photonics Technology Letters, vol. 6, No. 11, Nov. 1994.
F Derr: "Coherent Optical QPSK Intradyne System: Concept and Digital Receiver Realization", Journal of Lightwave Technology, vol. 10, No. 9, Sep. 1992.

* cited by examiner

*Primary Examiner*—Emmanuel Bayard
(74) *Attorney, Agent, or Firm*—Barnes & Thornburg LLP (57) ABSTRACT

A coherent receiver receives a set of signals which are spaced in phase, or phase and polarization, and a reference signal. The receiver processes the set of signals to determine which of the set of signals has a predetermined association (e.g. closest in phase) with the reference signal and selects that signal as an optimum output. The receiver has the effect of de-rotating the phase slip between the input signal and reference signal in discrete steps. The selecting occurs on a repeated basis to select an optimum output. The set of signals can be processed in the analogue or digital domains, by such techniques as: comparing the amplitude of each of the set of signals with a threshold, comparing signals with each other or cross-correlation. The processing can be implemented, if desired, without the need for complicated components, which would either be expensive or become unreliable at the extreme high operating frequencies used for optical communication.

38 Claims, 7 Drawing Sheets

COHERENT RECEIVER

FIELD OF INVENTION

This invention relates generally to the field of coherent receivers and, in particular, to coherent receivers for use with optical communications systems.

BACKGROUND OF THE INVENTION

Historically, transmitted optical signals were modulated by signals that change their amplitude or intensity. This had the benefit of being a straightforward approach, where Wavelength Division Multiplexing (WDM) was possible, but had the disadvantage that the capacity was limited as only a limited number of channels could fit into the passband of an Intensity Modulation Direct Detection (IMDD) system.

Coherent detection of phase modulated optical signals offers an advantage in terms of required Optical Signal To Noise Ratio (OSNR) over directly detected intensity modulated signals of an equivalent spectral efficiency. The main ways of implementing a coherent optical receiver are homodyne, heterodyne and intradyne.

The optical homodyne receiver is theoretically most straightforward. An Optical Local Oscillator (OLO) provided by a laser is phase locked to the recovered carrier so that the optical signal is directly converted to baseband. However, problems associated with the control of the laser mean that this is extremely difficult to implement in practice.

In an optical heterodyne receiver, the OLO is offset in frequency from the received signal so that it is outside the signal bandwidth. Image frequencies generated by mixing can then be removed by optical filtering ("image rejection"). This results in a requirement for an electrical bandwidth at the first Intermediate Frequency (IF) which is at least twice that required for the homodyne receiver and which may exceed the limits of available devices.

An alternative approach is phase diversity reception with an intradyne receiver which overcomes some of the shortcomings of the homodyne and heterodyne approaches by exploiting the ability to closely match the oscillation frequency of a remote transmitter with a local oscillator, using coherent sources. In an intradyne optical receiver, the optical local oscillator has a frequency within the signal bandwidth but, unlike the homodyne approach, it is not phase locked to the original carrier thereby eliminating the need for a complex control loop around the OLO laser. This requires a much narrower bandwidth than heterodyne approach because the local oscillator frequency is within the signal bandwidth. However, a consequence of lack of phase locking is also a tendency for an uncorrectable phase slip to occur between the demodulated signals and OLO.

Image rejection is not always possible since optical filters are ineffective when the IF spectrum consists of two almost superimposed spectra. An image rejection architecture for an intradyne receiver employs parallel quadrature signal paths which are mixed with local oscillators also in quadrature and then recombined such that one set of image components is cancelled. This approach requires that the parallel signal paths are closely matched in amplitude and phase to achieve the required degree of cancellation. It is difficult to maintain this degree of match between channels over a wide frequency band if the paths are not identical to each other in terms of the components contained therein.

A coherent optical intradyne system is described in Derr et al, Journal of Light Wave Technology, Vol. 10, No. 9, September 1992. This paper describes a receiver based on Quadrature Phase Shift Keying (QPSK) with a digital realisation of synchronous demodulation including phase synchronisation. This approach could, in principle, overcome the problem of matching channels, but is limited by the availability of sufficiently fast low cost digital electronics and analogue to digital converters.

A three fibre coupler is an attractive way of combining an optical local oscillator with a received signal and leading to signals which may be converted to electrical signals for processing. This works well with binary phase shift keyed (BPSK) signals, other than for the above mentioned phase slip, but in order to generate two components in quadrature with the signals on one output of the coupler, it is necessary to subtract one of the signals on the other two outputs from the other. This results in an asymmetry between the in-phase and quadrature paths, since the in-phase path does not undergo this operation.

A coherent intradyne optical receiver is described in Yamashita S, IEEE Photonics Technology Letters, Vol 6, No 11, November 1994. This receiver illustrates in FIG. 1 thereof a three-fibre coupler (the "3×3 fiber coupler") and describes using only two of the three outputs ("beat signals"). This approach has the limitation that it cannot detect two orthogonal phase channels, since only a single channel is produced at the intermediate frequency (IF).

It will be appreciated that in addition to the use of optical frequencies for effecting transmission of signals by phase shift keying (PSK) it is also known to employ optical properties such as polarization to effect modulation by polarization shift keying (PoISK) and indeed for both modulation forms to exist together. They are alike insofar as when demodulated in an asynchronous detector resultant electrical signals slip in phase relative to a particular datum that corresponds to a reference polarization.

It will be appreciated that an optical local oscillator which exploits coherence with an optical carrier of a transmitted signal represents a special case of transmission using two mutually coherent sources.

Thus a need exists for a coherent optical receiver which at least overcomes some of the problems of the prior art receivers. For example, an optical receiver which can accommodate uncertainties (phase or polarization slip) of the optical signals carried through to electrical signals derived therefrom and permit processing of separate, but related, channels for quadrature related signals; an optical receiver which overcomes the difficulties experienced hitherto with optical diversity reception in an economic and robust manner.

SUMMARY OF THE INVENTION

In accordance with a first aspect of the present invention there is provided a method, in a receiver, of coherently matching an input to a reference signal, wherein the input comprises a set of signals which have a mutual relationship and wherein the input has a non-ideal coherence with respect to a property of the reference signal, the method comprising:

processing the set of signals to determine which of the set of signals has a predetermined association with the reference signal; and, selecting, as an optimum output, at least one signal which meets the predetermined association.

The effect of the method is to minimise the difference between the input and reference signal in discrete steps. The selecting occurs on a repeated basis to select an optimum output. The property can be phase, polarization or a combination of phase and polarization. Where the property is phase, the effect of the method is to de-rotate the phase slip between the input and reference signal in discrete steps.

Preferably, the step of processing the signals comprises determining which of the set of signals is most closely matched to the property of the reference signal, such as which of the set of signals is most closely aligned to the phase of the reference or the phase and polarization of the reference. In making the determination, the property itself need not be measured, but some other property indicative of it. As an example, in determining which of the set of signals is most closely aligned in phase with the reference, the amplitude of each of the set of signals can be examined. There are various ways of using amplitude, such as comparing the amplitude of each of the set of signals with a threshold to determine the signal with the greatest amplitude, or comparing signals with each other. The advantage of using techniques like this is that the method can be implemented, if desired, without the need for complicated components, which would either be expensive or become unreliable at the extreme high operating frequencies used for optical communication.

In a preferred embodiment the step of processing the signals occurs on regenerated digital versions of the input set of signals, with all of the decision processing being implemented using logic gates.

The method has an advantage of being robust in operation and can offer a high degree of performance.

The method is particularly applicable to receivers of optical systems where it is particularly difficult to coherently match the phase of a reference source with a received signal.

The invention can be used with BPSK signals, with one signal being chosen as the optimum output. However, the invention is also applicable to multiple phase (NPSK) modulation schemes and in such cases multiple (N/2) signals are selected as the optimum output.

Further aspects of the present invention provide a control apparatus for a coherent receiver, a coherent receiver, a communications network incorporating the coherent receiver and a computer program product for implementing a method of controlling operation of a coherent receiver. The computer program product may be delivered on a machine-readable carrier, such as an electronic memory device, hard disk, optical disk or other machine-readable storage medium, or it may be downloaded directly to the receiver via a network. The computer program product may be installed on the receiver at the time of manufacture or it may be installed onto an existing receiver at a later date as an upgrade. All of these aspects of the invention can, as preferred features, implement any of the steps of the method that is described and/or claimed.

BRIEF DESCRIPTION OF THE DRAWINGS

Embodiments of the invention will now be described by way of example with reference to the accompanying drawings in which:

FIG. 3(*a*) is a schematic phase diagram of the apparent phase relationship between the electrical input signals analogous to the optical signals;

FIG. 3(*b*) is a schematic phase diagram similar to FIG. 3(*a*), but at a later time;

FIG. 8A shows a side profile of a phase-shifting element for use in the arrangement of FIG. 8; and, FIG. 8B shows a front view of a polarization-changing element for use in the arrangement of FIG. 8.

DETAILED DESCRIPTION OF EMBODIMENTS

Figure 1:
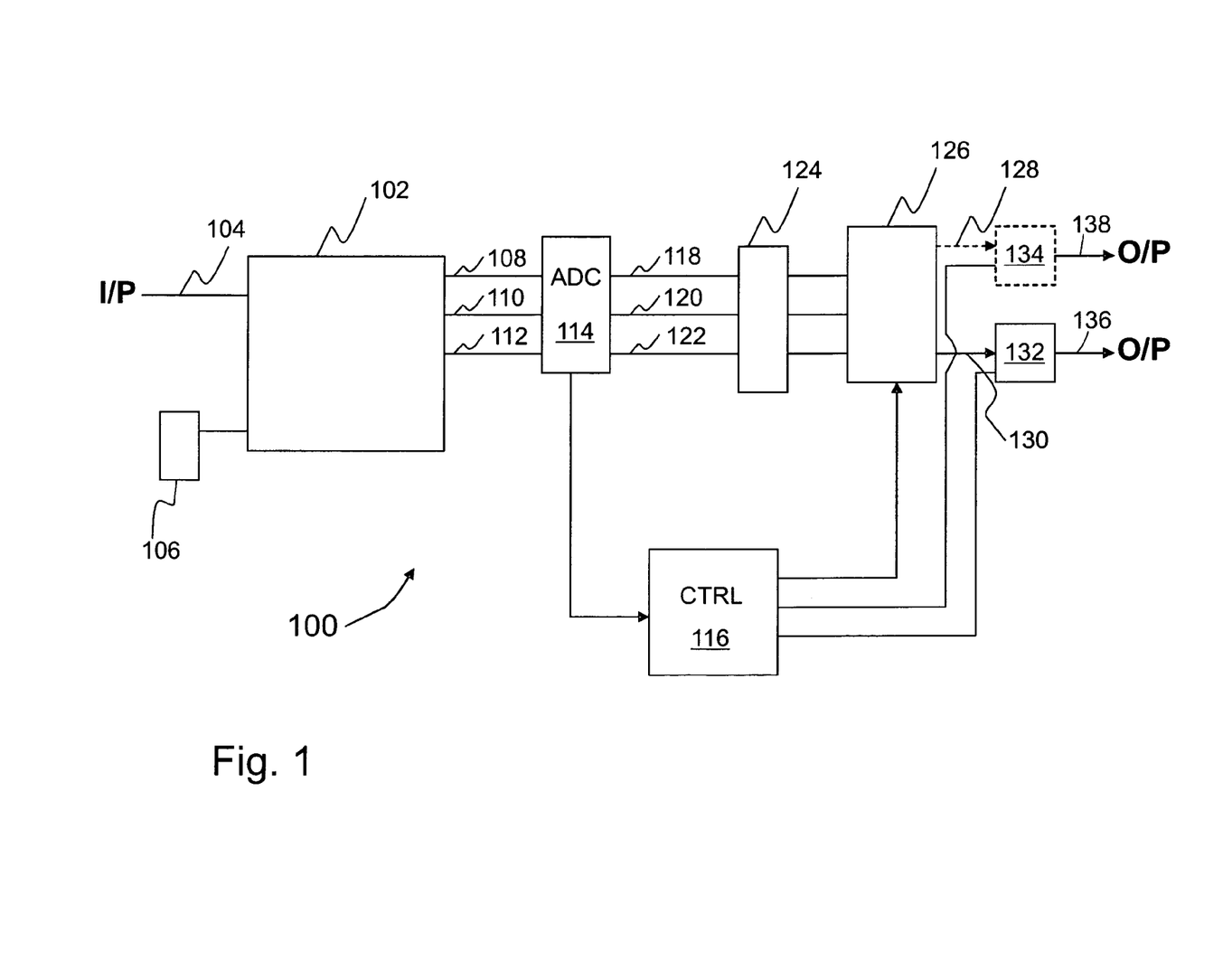
FIG. 1 is a block diagram of an optical receiver according to one aspect of the present invention.

Referring to FIG. 1, this shows a coherent receiver in the form of a coherent optical receiver 100. The receiver includes a 'front end' 102 which receives inputs in the form of an optical input 104 and an input from a local oscillator 106. The inputs are converted by the front end into three electrical outputs 108, 110, 112, although the front end can be arranged to produce any integer number of outputs. The three electrical outputs are converted from analog to digital by converter 114 and a component of each output is passed to controller 116. The digital outputs 118, 120 and 122 are then passed through a delay circuit 124 to switch 126. Switch 126 is controlled by controller 116 to produce an output 130, which is inverted (if required) by an inverter 132 to produce a final output 136 of the receiver. This final output is intended to be selected from the three electrical signals such that the output selected has the optimum characteristics for the future purpose of the output. The switch 126 can be controlled to also produce a second output 128 which can be inverted 134 to produce a second final output 138.

Figure 2:
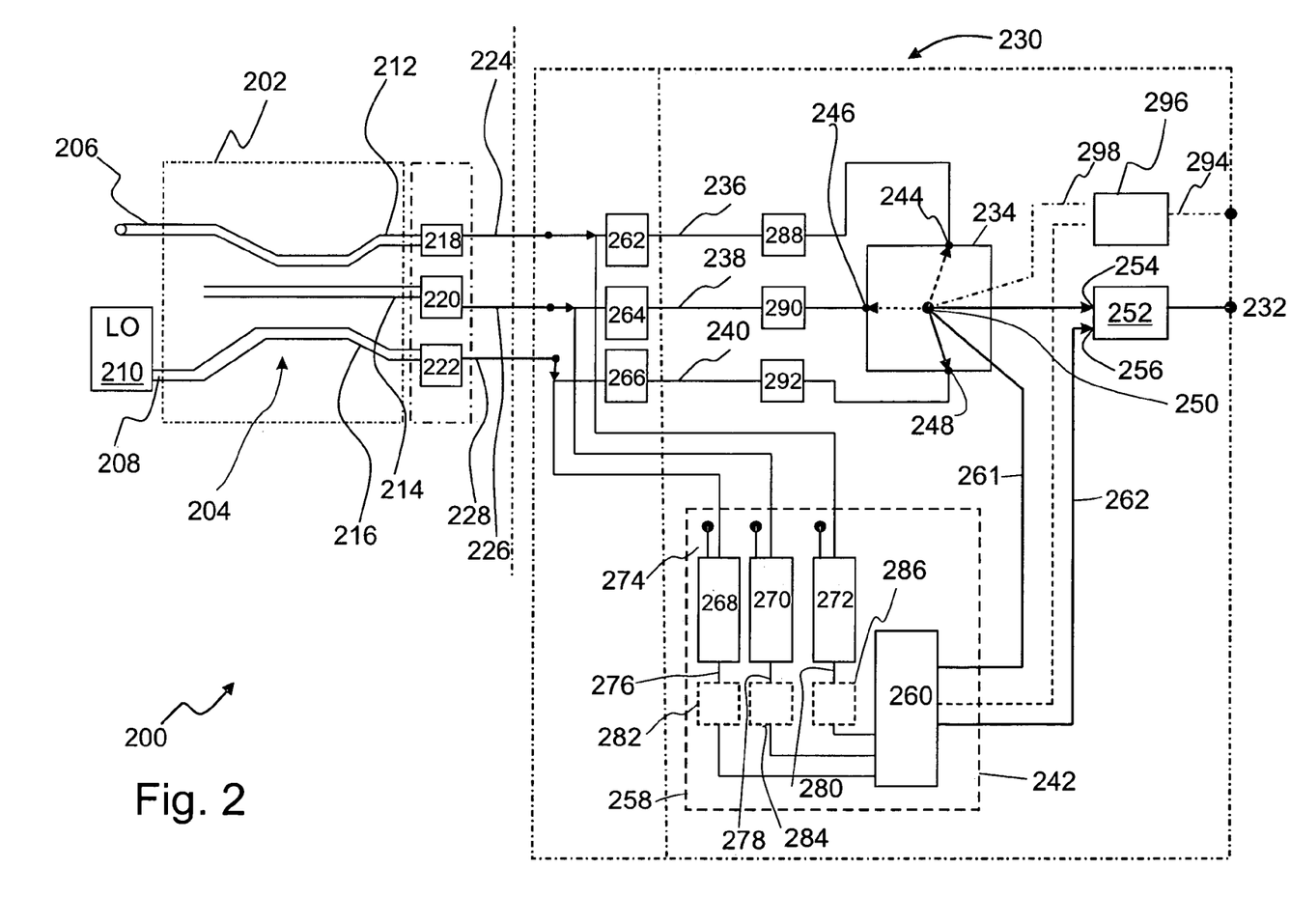
FIG. 2 is a detailed block circuit diagram of the FIG. 1 receiver.

Referring to FIG. 2, the receiver 200 includes a front-end 202 which comprises a three-fiber coupler 204 having a first optical inlet port 206, a second optical port 208 to which a local oscillator 210 is connected. The coupler 202 produces three optical outputs 212, 214, 216 which are passed to respective photodetectors 218, 220, 222 which convert the optical signals to respective electrical signals 224, 226, 228. These analogue waveforms 224, 226, 228 correspond to the modulation of the optical signal at inlet port 206, with the amplitude of the signals corresponding to the intensity of the received modulation signal when mixed with the local oscillator signal. As is well known for such a coupler-detector used with mutually coherent optical signals, the intensity waveforms of the optical signals 224, 226, 228 are phase displaced with respect to each other by approximately 120°.

In a conventional homodyne receiver arrangement, the received signal and local oscillator signals are maintained in phase and the phase of the modulation extracted with reference thereto. However, in a phase diversity receiver, there is a phase slip between the received and local oscillator signals which means that at any one output port the phase (as determined by the local oscillator) slips with respect to the received signal. Thus, the extracted intermediate frequency (IF) cyclically increases and decreases in intensity, being at a maximum when the port is in phase and at a minimum when in quadrature.

The electrical analogues of the optical signals, insofar as they each represent one of the optically related signals, exhibit an apparent phase relationship carried through by which the electrical signals may be manipulated and processed, and within this specification the term "phase" when applied to the electrical signals should be construed accordingly.

The receiver illustrated is intended to receive optical signals which are modulated by phase shift keying (PSK) as representative of binary digital pulses (BPSK), so that after detection there exists a bipolar signal which, if clean, assumes either positive or negative values about a mean value that would exist if only the local oscillator were present.

However, the optical signals themselves are subjected to distortion and noise effects during transmission so that the extracted bipolar analogue signals are physically distorted in terms of representing the transmitted pulses. As such, the extracted signals may exclude pulses of the information or include extraneous pulses, and/or have pulses within a data stream having binary levels opposite to what they should be (logical 'ones' instead of logical 'zeros' and vice versa), as well as being displaced in time (phase) relative to each other.

In working in the digital domain it is usual to apply the electrical analogues of the detected signals to a pulse regenerator in which a threshold level is set, and against which the analogue signal is compared to, in order to generate clean and uniform pulses representative of the digital information within the pulse train. For Binary Phase modulation, the signal will be bipolar. When the signal is clean, it will be either positive or negative (about the mean value which would exist if a local oscillator signal were present). Hereinafter the mean value which would exist if a local oscillator signal were present is referred to as the local oscillator datum.

In accordance with this first embodiment of the present invention a phase tracking switch arrangement is formed as indicated generally at 230. The switch arrangement is based upon each of the set of electrical detection signals 224, 226, 228 being nominally identical (although possibly inverted) representations of the information-carrying modulation signal originally transmitted. The switch 230 is operated so that the electrical signal showing closest proximity to the Local Oscillator datum phase is repeatedly selected.

The detectors 218, 220, 222 provide electrical signals which represent the optical signals and the phase relationships thereof. The switch arrangement 230 is configured to accept at least a primary set of three mutually phase spaced electrical signals and comprises a corresponding number of electrical signal inputs 224, 226, 228. The switch arrangement 230 further includes an output terminal 232, a switch device 234, a set of signal paths 236, 238, 240 (hereinafter called set paths), and a switch device actuator or controller 242. The set paths carry set signals from the respective input terminals to the switch device. The switch device 234 is shown schematically as a commutator switch having a set of three 'fixed' terminals, 236, 238, 240, one for each set path, and a 'selector' terminal 250 which is arranged to couple one fixed terminal at a time to the output terminal 232. The switch device 234 is in practise implemented by electronic switching elements, which can be controlled by an up-down counter. The coupling position of the switch device 234 is controlled by switch device actuator circuit 258 which includes, and is controlled by, signal processor circuit 260. Processor circuit 260 outputs a switch control signal 261 and a signal 262 for controlling operation of the inversion circuit 252.

In this embodiment, each input 224, 226, 228 is an analog input signal and an individually associated data regenerator or converter 262, 264, 266 is located in each respective set path 236, 238, 240 between the input terminal and the switch device 234. Each regenerator 262, 264, 266 receives an analogue input signal in the form of a sequence of possibly distorted binary pulse forms and outputs a corresponding sequence of clean pulses that comprises a digital information signal. This embodiment also includes an inversion circuit 252 which can effect a phase shift of 1800 in a signal passed to the output terminal 232. For reasons to be explained below, and if the signals from the switch device are of binary digital form, the inversion circuit may be realised as an Exclusive-OR (XOR) gate. The phase shift is effected by inverting the logical levels of signals applied at one gate input port 256 by providing a suitable logic level to the other gate input port 254.

For convenience of description the input signals 224, 226, 228 in their analog form are referred to here as A, B and C respectively, and the signals on set paths 236, 238, 240 from the regenerators 262, 264, 266 in digital form as signals A', B' and C' respectively.

Figure 3A:
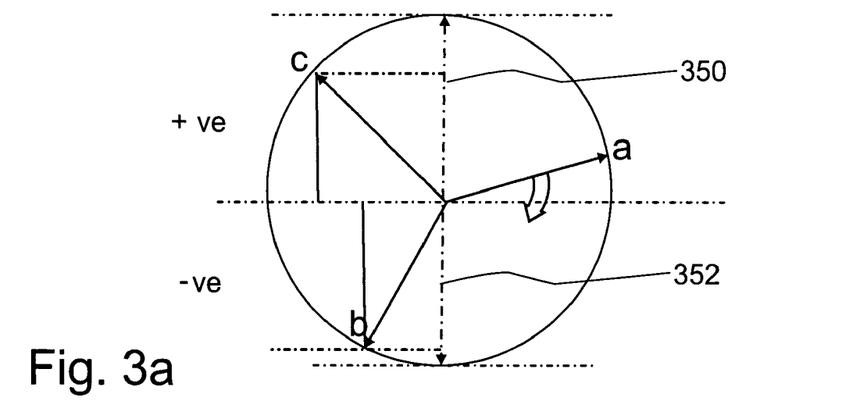

FIG. 3(a) shows a phase diagram representation indicating the phase of the local oscillator (LO) 210 and the value of any instantaneous phase slip between received signals and the local oscillator 210. The phase of the local oscillator is shown as vertical arrow 350 and is used to provide a reference or datum phase. The signals A, B and C are represented graphically in FIG. 3(a) by arrows a, b and c respectively. The optical signals ideally have a 120° phase difference with respect to each other although, in practice, the set of signals may deviate from the ideal mutual 120° spacing due to component tolerances and the like. The set of signals A, B, C rotate, as a group, with respect to the local oscillator signal. Although the signals A, B and C should contain the same information, at any time their relative amplitudes vary according to the variation in phase relative to the phase of the local oscillator. For example, the coherently detected signal amplitude will be at a maximum when the LO combines with the input signal with no relative phase difference while the coherently detected signal amplitude will go through zero when the LO combines with the signal at 90° and 270° relative phase. There is also likely to be a noise component which will be substantially constant.

The local oscillator phase defines both a phase reference, illustrated by arrow 350, and an anti-phase reference, illustrated by arrow 352, which is diametrically opposite thereto or, in phase terms, 180° shifted in phase. It will be appreciated that each of the signals A, B, C has an amplitude component which is a function of the displacement of that signal relative to the phase reference 350. The amplitude component of a signal decreases to zero as it approaches, and passes, a phase offset of 90° from the phase reference 350 and then increases in magnitude as it approaches the anti-phase reference 352. Thus, as used in this specification, any amplitude component is considered as being of a positive sense when within 90° of the phase reference 350 and of negative sense when within 90° of, and closest to, the anti-phase reference 352. Thus, having regard to the phase 350 and anti-phase 352 references together, it may be seen that the signal A, B, C preferred as being closest to the local oscillator reference may be that which is closest to the phase reference 350 or that which is closest to the anti-phase reference 352. If a preferred signal is a signal which is closest to the anti-phase reference 352, it is shifted in phase by 180° to compensate.

Figure 3B:
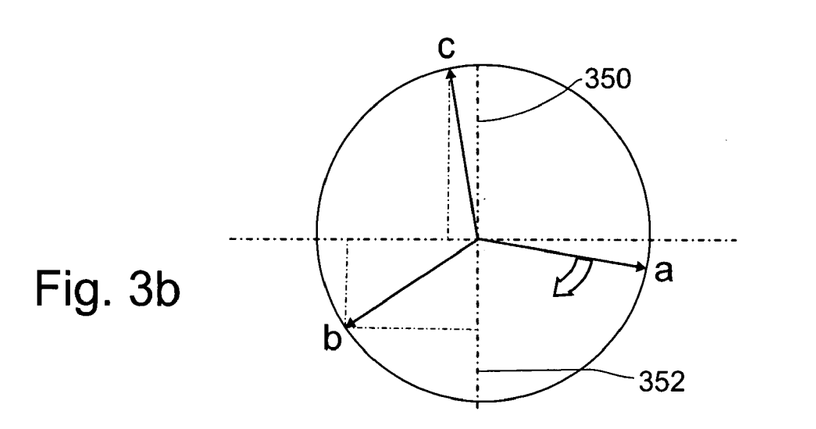

It can be seen from the phase diagram of FIG. 3(a) that, at the instant shown, the signal components A and C represented by the arrows a and c are both of the same phase sense as phase reference 350 (i.e. within 90° of phase reference 350) and the signal B represented by arrow b is of the opposite sense (i.e. within 90° of the anti-phase reference 352.) However, it will also be seen that signal B has greatest amplitude component in the phase datum direction at this time and signal A the least. For the purposes of illustration it is assumed that the signal components are rotating with respect to the phase reference in a clockwise direction. At a later time, such as that shown in FIG. 3(*b*), the phase relationships have changed and now only signal C is of the same sense as the phase reference 350 while both signals A and B are of opposite sense to it, signal A again having the least amplitude component. Overall, now signal C has greatest amplitude component.

It will be readily understood from the diagrams that as the set of signals rotate, the signal A passing through a minimum (zero) amplitude, and changing senses, happens to coincide with signal C (rather than B) becoming the signal with the greatest amplitude component.

The diagrams show that there are a number of ways to determine which of the signals A, B and C is closest to either one of the phase 350 and anti-phase 352 references. These include both magnitude and sense of amplitude components and/or relationships between the signals, some of which are outlined below.

For example, by detecting that signal A changes sense, the 'preferred' signal can be assumed to be the signal of the opposite sense (B in FIG. 3*a* or C in FIG. 3*b*). Detecting when signal A passes through zero amplitude may allow the same conclusion to be drawn although, in practice, detecting when a signal becomes zero and changes sense may be more difficult. This is due to the fact that it is necessary to determine when the signal has some value to determine its sense unless previous behaviour is taken into consideration.

Likewise, it will be seen that some time later, when signal B changes sign, signal A of the opposite sign is in the ascendant towards the anti-phase reference 352 and is preferred. From this it will be clear that when there are three signals, selection of the preferred signal also involves inversion of its polarity (180° phase shift) with respect of the new sense of the triggering signal.

Alternatively, the preferred signal may be determined on the basis of which signal A, B or C, prior to the regenerators, has the maximum amplitude component, either absolutely (in relation to a maximum achieved at the phase datum) or in relation to each of the others. Again, it is necessary to determine whether inversion of the preferred signal is required. If the situation is such that the phase slip is consistently in one direction, it may be assumed for three signals that each new preferred signal is of opposite sense to the last one. This inversion of the output may be effected automatically according to alternate actuations of the switch device, although it will be recognised that in some circumstances the phase slip may not continue in the same direction. In other words, the rotation direction in the diagram may change, and to this end it may be preferred to derive the sense information from the signals themselves where possible.

In FIG. 2, the processor 258 includes a generalised comparison circuit having a part 268, 270, 272 associated individually with one of the set signals A, B and C. The parts are arranged to receive the associated set signal and a threshold or comparison signal 274 defined according to a function of the phase reference. The function may be the maximum value for any one of signals A, B and C, from a combination of the other signals or possibly zero signal. A set of output signals 276, 278, 280 are derived from which one is selectable by decision circuit 260 as having an amplitude component and sense at a high level that directly shows it closest to the phase or anti-phase reference or a low level which (out of the three signals) indirectly points to which of the others is closest to the phase or anti-phase reference.

The switch device actuator 242 outputs a control signal 261 to control operation of the switch device 234 to ensure that the selector terminal 250 couples the correct set line 236, 238, 240 to the output terminal. Also, as a result of the processor 260 determining the sense of the preferred signal, i.e. whether it is closest to the phase 350 or the anti-phase 352 reference, the logical level of input 254 of the XOR gate 252 is set to non-invert, or invert, respectively, the preferred signal at the output 232.

As mentioned above, signals A, B and C, may be expected to depart from regular and predictable behaviour by noise effects that may make their instantaneous amplitude components and phase an unreliable guide for the purpose of controlling the switch device. However, the effects of such noise may be mitigated by effecting an averaging or low pass filtering to the signals to reduce such noise effect. A filter is associated with each comparison circuit part as indicated at 282, 284, 286 in FIG. 2. The filter may be any appropriate filter, such as a low pass averaging filter.

It will be appreciated that effecting low pass filtering of the comparison circuit output values 276, 278, 280 by averaging over time has the effect of introducing a temporal lag of the information used to control actuation of the switch device 234 with respect to the information passing through it. Thus it is preferred, as shown in FIG. 2, to introduce into each of the set paths a delay element 288, 290, 292 in which the appropriate, selected signal is passed by the switch device 234 only after a delay which is matched to the delay due to the filtering 282, 284, 286 and any other delay inherent in the processing. The delay elements may be any appropriate element, such as shift registers. If there are no delay elements in the system, then the information used to switch the selector is based on an average of recent history, so will always relate to the past and there is no ability to anticipate shifting the switch position based on what is about to happen. By introducing a delay 288, 290, 292 in all the set paths to approximate to the delay resulting from the processing, then the information used to switch the selector will be based on an average symmetrically forwards and backwards in time.

It will be appreciated that such a delay to the information signals may be introduced to analog signals A, B and C, before A-to-D conversion and regeneration, although this is less convenient than delaying the signals once they have been transformed into the digital domain.

Figure 4:
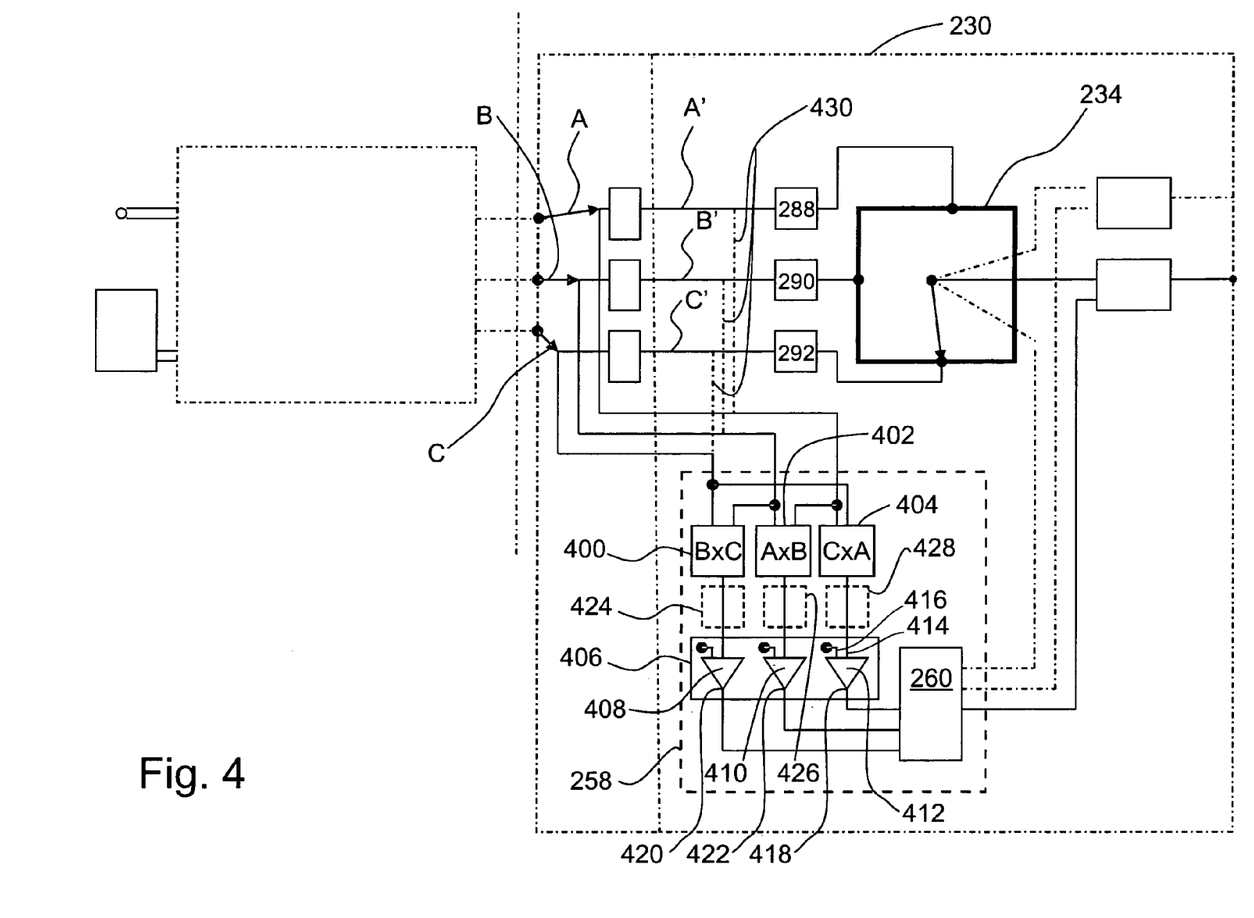
FIG. 4 shows a second embodiment of the receiver.

Referring to FIG. 4, this shows a second form of receiver, which is generally similar to FIG. 2 except for the signal processing circuit indicated at 258. In this form of signal processing circuit the analogue signals A, B and C are subject to cross-correlation in pairs, i.e. A×B, B×C and C×A, in order to determine which signal is the preferred signal from the various pair correlation product values.

The processor circuit 258 comprises cross-correlation circuits 400, 402, 404, each having two inputs to which are fed pairs of set signals A, B and C from the input terminals (or regenerated signals A', B' and C' from the set paths), each input or path providing a signal to two correlation circuits as shown. The outputs from the cross-correlation circuits comprise pair correlation product values having magnitude and sense according to the senses of the paired signals. A product derived from two signals of the same sense, whether positive or negative, will be of positive sense whereas a product derived from two signals of opposite sense will be of negative sense. The processor circuit 258 includes a comparison circuit, indicated generally at 406, which has a comparator associated with each of the correlation circuits to compare each pair correlation product value with at least one reference value. An alternative would be to offset the logical input signals to be +/−V.

In this embodiment the comparison circuit 406 includes a plurality of decision circuits 408, 410, 412 associated individually with respective cross-correlation circuits. As an example, decision circuit 412 is arranged to receive, at a first input 414, the pair correlation product value and, at a second input 416, a reference value derived from a mean level of the set signals A, B and C. Decision circuit 412 operates to provide a decision signal at 418 that has a level indicative of the contributions of the amplitude components of the signal pair A and C to the pair correlation product value. Corresponding decision circuits 408 and 410 provide decision signals at 420 and 422 respectively and the processor circuit 260 compares the values of the various decision signals and/or the senses thereof relative to the reference signal. The processor circuit 260 may determine which is the lowest product correlation value and, from that, which signal is not contributing to it. As an example, if the values for A×B and B×C are greater than for C×A then it may be assumed that B is the signal with an amplitude component closest to the phase (or anti-phase) reference. Alternatively or additionally, the processor circuit 260 may determine which are the largest pair correlation products of the three and which set signal (A, B or C) contributes to more than one of the largest. Thus, if the correlation product values A×B and B×C exceed the threshold but C×A does not, this points to B as having the largest amplitude component and thus closest in phase to the phase or anti-phase datum.

This second approach has an advantage that it is not limited by the number of inputs in the set paths. Each signal is required to contribute to a minimum of two pairs and greater accuracy may be achieved with larger numbers of inputs, if available. However, if a situation arises where it is found that too many pair correlation products qualify for consideration by exceeding the reference level, or indeed too few qualify, the comparison circuit may be arranged to vary the reference level automatically, or it can be varied manually, to change the number of cross-correlation values exceeding it.

As an alternative to a predetermined reference common to all of the decision circuits, each may be supplied with reference levels derived from pair product values of the other cross-correlation circuits such that the decision is based upon relative values. Indeed, any appropriate reference may be used.

In order to accommodate the effects of noise the pair correlation product values may be integrated over time by filtering, or in some other manner, to effect an averaging before comparison with a reference value. As shown, each cross-correlation circuit is optionally provided with a filter circuit 424, 426, 428 respectively. The filter may be a low pass filter and is operable to integrate the pair correlation values before application to the decision circuit and to mitigate the effects of noise and other high frequency effects in the signals. This is particularly relevant to signals of sharp pulse form where noise presents itself as extraneous pulses and/or upsets timing predicated on pulse occurrences. As described above, each of the set paths may include a respective delay element 288, 290, 292, such as a shift register. This ensures that that the appropriate selected signal is passed by the switch device only after a delay matched to the delay due to the processing. As the filtering is performed digitally on timed pulses, it is readily effected as an averaging of a predetermined number of set signal pulses received before and after a particular time and the delay devices arrange to make available to the switch device the signals of said particular time when it is actuated.

A set signal A, B or C of negative sense relative to the datum phase may be selected as the preferred signal provided it is accompanied by inversion of the signal A', B' or C' delivered to the output. In this case it is appropriate to consider correlation (as between a pair of the signals) with respect to the anti-phase datum as being distinct from "uncorrelated" where there is low value of correlation irrespective of sense. The term "anti-correlated" may be employed in respect of signals that show good correlation with respect to the anti-phase datum.

As discussed above, any pair correlation product may also have a positive or negative sense depending upon whether the component signals are of the same or opposite senses. Also, where there are three signals, the correlation pair not contributed to by the signal closest to the phase datum or anti-phase datum will, at least with respect to the reference level with which they are compared, have a pair correlation product value of different sense to the other two product values to which that signal does contribute. Therefore, the processing circuit 258 of FIG. 4 may be readily adapted to determine the preferred signal on the basis of this alternative criterion or by a mixture of both.

It will be appreciated that a situation may exist in which one of the signal components, such as A, is exactly at 90° with respect to both the phase datum and anti-phase datum, and both signal components B and C may equally qualify as preferred. In practice, this situation will follow from a determination of which one of them had previously been preferred and is now on the descendant, so that it may be made appropriate to select the other (ascendant) one as preferred and effect inversion at the output, following an established sequence.

The principle of cross-correlation for determination of the preferred set signal may be applied to set signals A, B and C in the analog domain, as just described, or in the digital domain on digital data signals A', B' and C', as indicated by the broken lines 430 in FIG. 4.

It will also be appreciated that selection of the preferred signal by the switch device 234 may be made as frequently or infrequently as desired. However, insofar as the set signals are of binary form, it may be preferred to effect switching in synchronism with level change of at least one of the set signals. To this end, one of the regenerators may provide a clock for timing operations of the switch device 234 as a result of actuator processing. However, given the above-discussed uncertainty regarding the stability and purity of any one set signal, it may be preferred to derive such a clocking signal as an average of those obtained from all of the regenerators.

In addition to actuation of the switch device 234, other elements of the processor circuit 260 may be controlled by clock signals derived from the repetition frequency of one of the set signals or an average of all of them.

Figure 5:
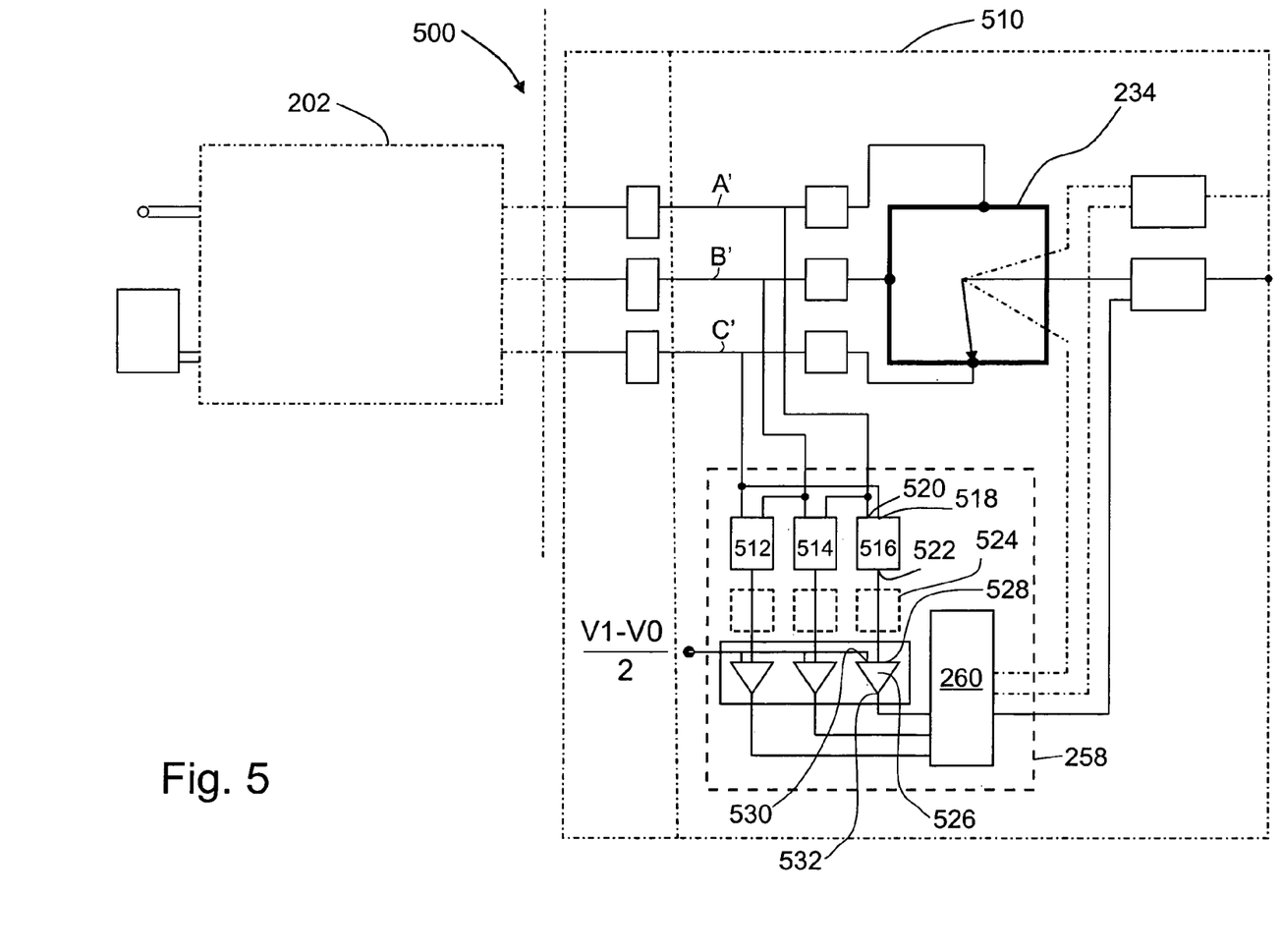
FIG. 5 is a block circuit diagram of a third embodiment of the receiver.

Referring now to FIG. 5 this shows a further embodiment of a receiver 500 comprising a front end 202 and a switch arrangement 510, generally the same as FIG. 4, and the common components have the same reference numbers to avoid repetition of description. The switch arrangement 510 differs from arrangement 230 in respect of the processor circuit 258, operating on the digital data signals A', B' and C' on the set paths. The processor circuit 258 comprises exclusive-OR (XOR) gates 512, 514, 516 which each receive a pair of signals A', B' and C'. Gate 516 is arranged to receive A' and C' via ports 518, 520 and to produce, at output port 522, a binary gate signal having a logical state depending upon relative levels of the binary digital signals A' and C'. For this type of gate, similar levels of signal produce a logical 0 and different levels produce a logical 1 (or vice versa). The gate 516 has, associated with its output port 522, a filter 524 (e.g. a low pass filter) which is operable to average the binary gate signals to define a tracking bandwidth for changes in the gate output signals. The filter produces a substantially fixed or slowly varying voltage level that is somewhere between the voltage levels representing the binary 0 (V0) and 1 (V1) levels of the pair of set signals A' and C' contributing thereto. The value of the voltage depends upon both signal contributions, and is associated with a decision circuit 526. The decision circuit is arranged to receive, at first input port 528, the averaged gate output signals and, at a second input port 530, a threshold or reference level corresponding to the mean level of the binary set signals (V1-V0)/2, and produce a binary decision signal at 532. This binary decision signal has a logical level indicative of the set signal pair A' and B' contributing to the gate output being greater or less than the mean level. The processor thus receives a three-bit signal indicative of the contributions of the relative pairs of signals A', B', C'. Processor circuit 260 can thus determine, from the binary decision signals for all of the pairs of set paths, a preferred signal for selection. The following 'rules' can be used by the processor 260 to determine a preferred signal.

(a) BPSK signal, switch has three equally spaced ports.

Measure cross-correlation between all the digitised set paths. The best set path is the one that anti-correlates with the other two. This can be explained as follows. It is known that the signals are (ideally) mutually spaced apart by 120° and that (from FIG. 3b) the signal which is closest to the phase or anti-phase datum is of opposite sense to the others. As an example, consider the situation in FIG. 3b where C' is the signal that is closest to the phase datum 350. It can be seen that A' and B' will both be of a negative sense. A'×B' will produce a positive result while B'×C' and A'×C' will both produce negative results. Thus, C' is the signal that anti-correlates with both of the other signals and the signal which should be selected by the switch device 234.

(b) BPSK signal, switch has N input ports (set paths).

Measure cross-correlation between binary outputs of the outputs of the regenerators on each of the N set paths. Determine the pair of cross-correlations with the highest value (either +ve or −ve). The set path that contributed to the two best correlations is the correct set path. When the best correlated set path changes, requiring a change in the switch position, and the sign of the cross-correlation changes, then it is necessary to invert the output. This will work for values of N>=3.

An alternative rule can be based on the property that a set path signal passing through the phase which is exactly orthogonal to the reference will change the sign of its cross-correlation with the others. With knowledge of the mutual spacing of the set of set paths, this may be used to switch to the ports known to be most orthogonal to the one that just changed.

(c) NPSK (i.e. multi-phase modulation scheme), switch has M input ports (set paths).

Cross-correlate the M regenerated signals on the set paths. The principle behind a multi-phase transmission format is to maximise the orthogonality of each of the N/2 output channels. Therefore, in order to choose the best candidates from M ports, there is a need to detect the set of N/2 regenerated set paths with the greatest orthogonality (least cross-correlation) between them. This may be achieved by measuring the cross-correlation between all the possible sets of N/2 ports, chosen from the total available M ports. The switch then selects the set of N/2 ports with the lowest cross-correlation between them. In practice, only a subset of possible sets will contain the correct set paths, these being set paths which are approximately evenly spaced in phase. When the identity of the best correlated set path changes, if the sign of the cross-correlation changes then it is necessary to invert the sign of the data when switching to it. It is possible to obtain a more accurate estimate of when it is necessary to need to switch by comparing the degree of cross-correlation of the different pairs of ports. Knowing the actual phase angles defined by the optical coupler network, and the magnitude of the various cross-correlations, enables a more accurate estimate of the mean phase error.

As will be appreciated from the above description, it is possible for a single set of signals A, B and C (or A', B' and C') to select a preferred signal on the basis of a single one of several available criteria. In such a situation, determination of candidate preferred signals may be effected simultaneously on the basis of different criteria and the final determination made by accumulation of similar results or selection between results based upon relative merits or certainties.

In the above described embodiments the switch arrangements 230 and 510 have been shown with a single output terminal 232 (FIG. 2) from which the signal preferred as being closest to a datum phase is output. There may be a subsidiary output terminal, such as that shown ghosted at 294 in FIGS. 2 to 5 and the switch device 234 may have a subsidiary coupling function, also shown ghosted at 298, which under the control of switch device actuator circuit 260 also couples one of the other set signals, such as the least preferred or most out of phase signal, to the subsidiary output terminal 294 by way of subsidiary inversion circuit 296.

Also, for ease of description and practicability of implementation, the above embodiments have been described with three or multiples of three signals and paths to the only set. It will be appreciated that there may be more signals to the set, having less (apparent) phase separation between them and the processor circuit adapted to select corresponding set paths on the basis of their respective amplitude components or correlation between pairs, although some of the above discussed selection criteria based on odd-one-out may be unsuitable alone.

As indicated above, the set of input signals A, B and C applied to the switch arrangement may not be the only set but may comprise a primary set and the switch arrangement be provided also with one or more further sets of input terminals, set paths with associated regenerators, output terminals and switch devices with associated actuation circuits independently or shared.

The paths associated with the primary set, and any further set of signals, may be totally independent of each other, effectively forming separate switch arrangements. More usefully, the signals may comprise complex signals, for instance of multiple phase shift keying (MPSK), such as the I (in-phase) and Q (quadrature phase) component signals of QPSK modulation, for which the switch arrangement comprises a secondary set of input terminals and set paths with associated regenerators and optional delay circuits, secondary output terminal and secondary switch device with associated actuation circuit.

Figure 6:
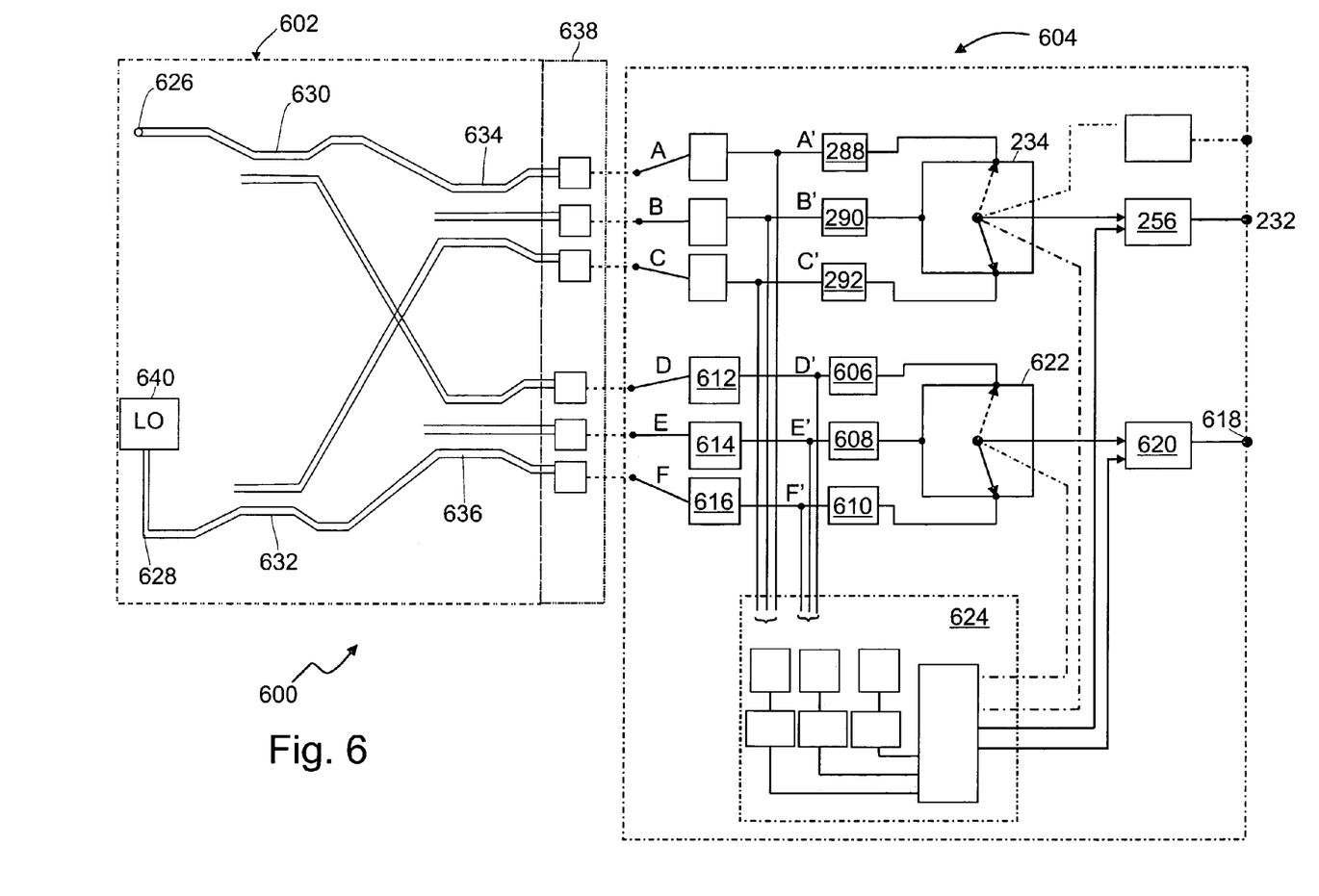
FIG. 6 is a schematic block circuit diagram of a fourth embodiment of the optical receiver.

Referring to FIG. 6 this shows a fourth embodiment of optical receiver 600 including an exemplary front-end 602 described below that delivers six signals in two sets according to I and Q channels of QPSK modulated transmission and a switch arrangement 604. The switch arrangement 604 is generally similar to the switch arrangement 230 of FIG. 4, but includes a secondary set of input terminals receiving analog signals D, E and F, set paths (equivalent to 236, 238 and 240 of FIG. 2) which include regenerators 612, 614, 616 producing binary digital signals D', E' and F'. The arrangement further includes optional delay devices 606, 608, 610 secondary output terminal 618 with associated inversion circuit 620 and a secondary switch device 622 with associated secondary actuator circuit 624.

Figure 7:
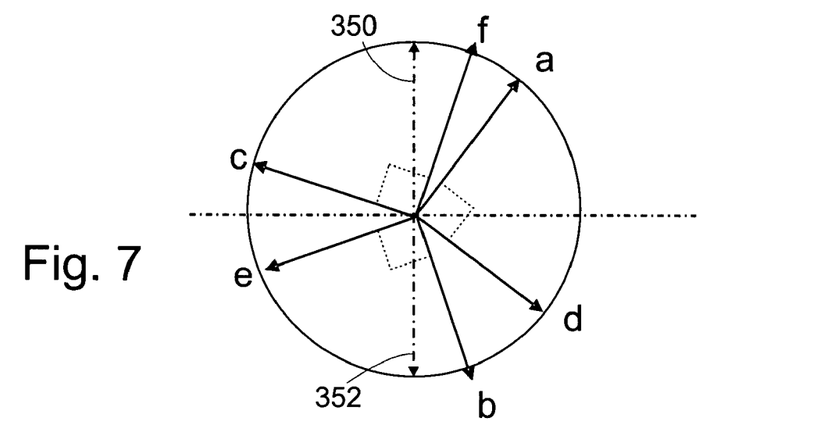
FIG. 7 is a schematic phase diagram similar to that of FIG. 3(*a*) showing two sets of signals in quadrature; and, FIG. 8 is a schematic diagram of a front end of a receiver which is responsive to phase and polarization.

Before describing the switch arrangement operation, reference is made to FIG. 7 which is a schematic phase diagram similar to that of FIG. 3(*a*). The phase and anti-phase datum or reference are shown by arrows 350 and 352 and primary set signals A, B and C with mutual 120° apparent phase spacing by arrows a, b and c. Additionally, the secondary set of signals D, E and F are shown by arrows d, e and f which also have mutual 120° spacing but each of signals D, E, F is paired in quadrature with one of the primary set, in this case A and D, B and E, C and F.

In such signal form it is generally considered more important to identify a pair of signals of the respective sets most in quadrature with respect to each other as providing the best pair for generating an output. In addition, it may be that that neither one is, on its own, necessarily the best with respect to a local oscillator or other phase datum or reference. However, such a factor may be determined according to the above described criteria and may be used to decide which pair of a number of candidates is preferred as there exists substantially equal or known orthogonality.

It will be seen from FIG. 7 that, by assuming the pairing relationship between I and Q components, cross-correlation between the relevant pairs will determine which pair gives the lowest degree of cross-correlation for current conditions and thus are most in quadrature. Such cross-correlation may be effected between each possible pair of signals with determination of which pair has the lowest degree of correlation without any assumptions as to pairing of paths. As all six channels are expected to contain slightly different information from the ideal, such multiple determination enables a pair to be selected as best for outputting. Alternatively, it may be assumed that of the full set of six paths, there is a sub-set of three possible pairs, namely A and D, B and E, C and F, and to confine the cross-correlation and determination of lowest correlation to the signals of this sub-set only.

Referring again to FIG. 6, the switch arrangement 604 includes switch device actuator processor circuit 624 which is not shown in detail, but conveniently takes the form of other equivalent elements in other figures. The processor circuit is adapted either to receive the sub-set of path signals A'D', B'E' and C' F', which are known to be paired, on three processing channels or all of the signals A' to F' on 15 channels representing all possible pairing combinations. The processing circuit 624 is arranged as described above to determine the worst correlating pair. The worst correlating pair of signals is indicative of signals best in quadrature with one another and thus which of the signals A-F are preferred to be output on the two output channels.

As the signal sets may be kept separate, if all pairs are considered it is also possible to effect processing of the signals to determine from high correlation values which signals of say, the primary set, are closest to the phase 350 or anti-phase 352 reference and which signals are furthest from them, and to separately define a quadrature pair or confirm a pair found by direct correlation.

Thus, referring again to FIG. 7, selection of a quadrature pair may be made on the basis of the relationship between each set path signal and a phase and/or anti-phase reference derived from the local oscillator. By cross-correlation between the pairs of signals, it may be determined in the manner outlined above for BPSK signals which of the channels is the I channel and/or the Q channel by its relationship with the phase or anti-phase reference, for each signal independently or for pairs comprising the sub-sets.

It will also be appreciated that such determination for the signals of each set also determines which I channel signal is most in-phase with the phase and anti-phase references and may define or confirm the best output pair whose relationship is determined by correlation between them.

Thus if signal B were preferred as closest to the phase or anti-phase reference for passage to the primary output terminal 232, the signal E is furthest from that reference and preferred for passage to the secondary output terminal 618. It will be seen that for any such pair of sets, such selection may be based upon criteria determination for one set alone, with the switch devices slaved to each other. Alternatively, selection may be based upon criteria for both sets independently or upon criteria for both sets together. Thus, using the criteria outlined above for BPSK modulation signals, determination of the magnitude of the amplitude component B or change of sense of C or both may be used to select the orthogonal pair.

The above described methods relating to determination of two channels for QPSK modulation may be extended to a generalised MPSK modulation receiver having M possible phase conditions. By determining the lowest cross-correlation by cross-correlation between all possible pairs of path signals, output selections can be made.

It will also be appreciated that, throughout, the above description has been based upon the set or sets of input signals to the switch arrangement being of analog form and the switch arrangement including pulse regenerators between the input terminals and each switch device. The switch arrangement 234 may alternatively receive a set or sets of input signals already of regenerated binary digital form from regenerators outside of the switch arrangement. In this case, processing of the signals for switch actuation as described above is then confined to forms applicable to binary digital signals.

Also, the inputs could come from a different front end other than the optical front ends described herein. For example wireless, RF or any other appropriate form which can be converted into digital form by appropriate means.

It will also be appreciated that the source of signals for the switch arrangement and the origin of the datum phase as a local oscillator is exemplary only and open to variation. The receiver may receive signals from any mutually coherent sources, not necessarily including a local oscillator, where one is to be demodulated relative to the other and either source may be modulated or both sources may be modulated with information signals that are non-interfering. Thus it is possible that the reference against which phase slip occurs is itself an information signal. The sets of signals input to the switch arrangement may modulated in both phase and polarization.

FIG. 6 shows, for completeness, a fiber coupler arrangement. The coupler includes a pair of optical input ports 626 and 628, one input 628 being connected to a local oscillator 630 and the other input 626 being connected to a source of transmitted signals conveying information by QPSK modulation (not shown). The input ports 626 and 628 are each coupled to a two-fiber coupler 630, 632 respectively, each coupler having a respective pair of output ports which serve as input ports to a pair of three-fiber couplers 634 and 636. Each three-fiber coupler extracts optically a primary and secondary set of optical signals for detection, the sets ideally being 90° apart in phase (or polarization) and the signals within each set being 120° apart, before application to photoelectric detectors 638 which in turn are suitable for coupling two sets each of three electrical signals to the input terminals of the switch circuit 220.

It is re-iterated that the invention is not limited to, nor should be construed to be limited to, including an optical front end employing a local oscillator and/or to phase modulated and/or polarization modulated signals. Instead, the invention is relevant to any system for receiving and processing as electrical binary digital signals any information carrying optical signals for which two coherent sources enable the information to be extracted and converted for processing as set out.

The optical network 602 may alternatively be used for polarization diverse detection of BPSK by introducing birefringence into the upper and lower paths (e.g. 701, 702) such that the outputs A, B, C and D, E, F correspond to 3 phases for each of two orthogonally polarised components of the signals.

Figures 8, 8A, 8B:
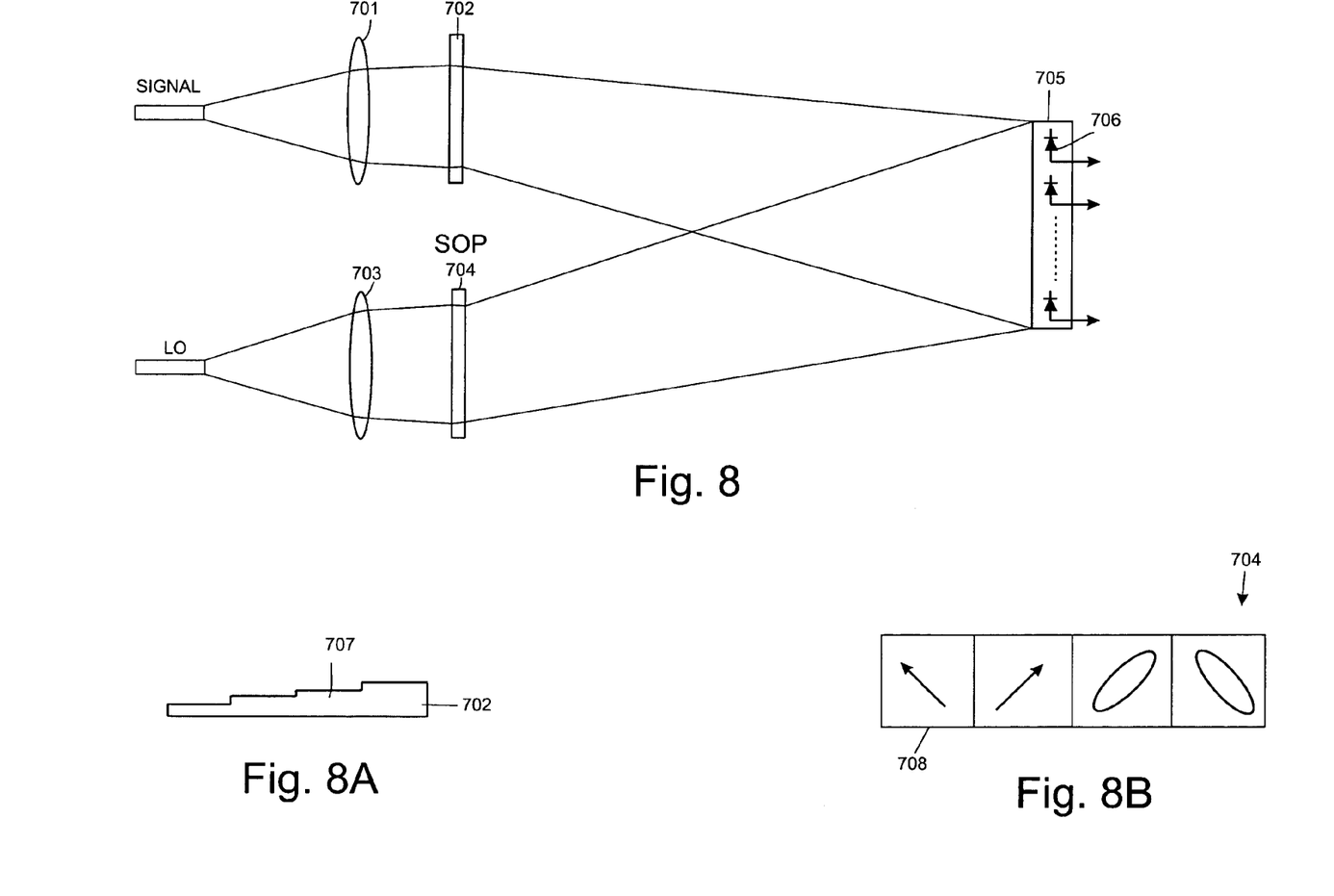

When detecting a signal which is of uncertain phase and polarization state, it is preferred to distribute the multiple ports of the coherent detection system uniformly across the signal space, which means uniformly across possible phases and polarizations. This is better than first splitting in polarization, then splitting in phase, because the ports then are grouped together. For example when the signal and local oscillator entering coupler 634 are cross-polarized, all the 3 outputs are nulled. If we can distribute the ports more uniformly in phase and polarization we will achieve a better sensitivity for the same number of ports, with a benefit that we can use fewer ports. FIG. 8 shows an embodiment of a front-end, based on bulk optics, to achieve distribution across phase and polarization. This arrangement replaces parts 630, 632, 634, 636 shown in FIG. 6. It has two input ports—signal and local oscillator—and N output ports. This coupler is designed such that each of the N output ports sees a different phase and polarization state, these states being equally distributed around the Poincare sphere. Referring to FIG. 8, a single local oscillator input signal is split into N beams 703, and then passed through an element 704 which modifies the state of polarization (SOP) of each of the N beams. Each of the N beams are modified in a different manner, the set of SOPs being equally distributed in polarization. The single signal input is similarly split into N beams, and then passed through an element 702 which provides different phase delays to each of the beams such that their phases are equally distributed in phase. The two sets of N beams, ach having been modified in phase or polarization, are then superimposed such that there is coherent interference. The optical signal resulting from this coherent interference is immediately photo-detected on an array 705 of N photo-detectors 706. Alternatively, the light can be guided to N remotely mounted photo detectors 706. Once detected, the signals can be processed as previously described. FIG. 8A shows a side profile of the element 702 which can provide differential phase delays. The element 702 has a stepped profile, formed from N sections 707, each having a different thickness. FIG. 8B shows a front view of element 704. It comprises N panels 708, each causing a different polarization shift. In this embodiment, elements 702 and 704 are shown as linear arrays of N sections although it may be more advantageous to arrange the sections as a two-dimensional array, e.g. if N=4 then the array can be 2×2.

In the illustrated embodiments the inversion circuit (132 FIG. 1, 252 FIG. 2) is shown as a final stage of the apparatus. In an alternative embodiment an inversion circuit can be included in each of the signal paths leading to the switch, at any point between the output of the opto-electrical conversion (218, 220, 222 FIG. 2) and the inputs to the switch (244, 246, 248 FIG. 2).

It should be understood that the embodiments shown and described in detail are illustrative examples only if the principles of the invention whose scope is not intended to be limited thereby but only by the appended claims.

We claim:

1. A method of receiving data transmitted by modulating a carrier, the method having the steps of coherently matching the received modulated carrier to a reference signal, the reference signal having phase or polarization slip relative to the carrier, to generate a set of detected data signals which have a mutual relationship and are each associated with a differing state of the slip between the reference signal and the carrier,
determining which of the set of detected signals is associated with a current state of the slip, and
based on this determination, selecting, as a current output, at least one of the set of detected signals.

2. A method according to claim 1 wherein the step of determining comprises determining which of the set of signals is most closely matched to a property of the reference signal.

3. A method according to claim 2 wherein the property is phase and the step of determining comprises determining which of the set of signals is most closely aligned to the phase of the reference signal.

4. A method according to claim 3, wherein the property is phase, wherein there is an in-phase datum representing the phase of the reference signal and an anti-phase datum, and wherein the step of determining comprises determining which of the set of signals is most closely matched in phase to the in-phase datum or anti-phase datum.

5. A method according to claim 4 wherein, if it is determined that the selected signal is most closely matched to the anti-phase datum, the method further comprises the step of inverting the selected signal.

6. A method according to claim 4 wherein the step of determining which of the set of signals is most closely matched in phase to the in-phase datum or anti-phase datum comprises determining which of the set of input signals has the greatest amplitude.

7. A method according to claim 4 wherein the step of determining which of the set of signals is most closely matched in phase to the in-phase datum or anti-phase datum comprises determining which of the set of input signals has the smallest amplitude and determining, from the mutual relationship of the set of signals, which of the remainder of the set of signals has the greatest amplitude.

8. A method according to claim 4 wherein the step of determining which of the set of signals is most closely matched in phase to the in-phase datum or anti-phase datum comprises determining which of the set of input signals is changing sense and determining, from the mutual relationship of the set of signals, which of the remainder of the set of signals has the greatest amplitude.

9. A method according to claim 6 wherein the step of determining which of the set of input signals has the greatest amplitude compares each signal to a threshold which is a function of the reference signal.

10. A method according to claim 4 wherein the step of determining which of the set of signals is most closely matched in phase to the in-phase datum or anti-phase datum comprises comparing pairs of the set of signals.

11. A method according to claim 10 further comprising filtering the outputs of the comparisons whereby to average the comparisons over a period of time.

12. A method according to claim 10 wherein the step of comparing pairs of the set of signals comprises cross-correlating pairs of the set of signals.

13. A method according to claim 12 further comprising determining which of the set of signals appears in the correlations having the greatest value.

14. A method according to claim 12 further comprising determining which of the set of signals is anti-correlated with the other signals.

15. A method according to claim 12 further comprising filtering the outputs of the correlations whereby to average the correlations over a period of time.

16. A method according to claim 10 wherein the comparisons are performed on digital versions of the set of signals.

17. A method according to claim 16 wherein the digital versions of the set of signals are regenerated signals.

18. A method according to claim 16 further comprising time-averaging the results of the comparisons and comparing each of a set of time-averaged comparisons with a decision threshold.

19. A method according to claim 18 wherein the decision threshold is representative of a mean level between binary levels of the digital signals.

20. A method according to claim 16 further comprising determining which comparison, from the set of comparisons, has an output different from the others, this being indicative of the pair of set signals contributing to that comparison not being most closely matched to the reference signal.

21. A method according to claim 16 wherein the set of signals comprise M signals which are derived from an input signal which is modulated by an N-phase modulation scheme (M>N), the method further comprising determining, from the comparisons, which N/2 of the set of M signals have the lowest cross-correlation between them.

22. A method according to claim 21 wherein, if more than N/2 possible signals are identified as having the lowest cross-correlation between them, the method further comprises selecting the N/2 signals which are most equally spaced in phase, or phase and polarization.

23. A method according to claim 16 wherein the step of comparing the digital versions of the signals comprises comparing pairs of signals using XOR gates.

24. A method according to claim 1 wherein the step of determining occurs in a processing path which is in parallel to a main path and wherein the step of selecting comprises delaying the set of input signals in the main path whereby to compensate for the delay introduced by the processing path.

25. A method according to claim 1 wherein the mutual relationship of the set of detected signals is a phase-shifted relationship.

26. A method according to claim 25 wherein the set of detected signals are electrical signals which have been derived from optical signals received by an optical front end of a receiver in which the method is performed.

27. A method according to claim 25 wherein the set of detected signals are substantially equally spaced in phase, or phase and polarization.

28. A method according to claim 1 further comprising deriving clock timing for the determining from at least one of the set of detected signals.

29. A method according to claim 28 comprising deriving clock timing for the processing from an average taken across all of the set of signals.

30. A method according to claim 1 further comprising making the step of selecting an output in synchronism with a level change in one or more of the set of detected signals.

31. A method according to claim 1 further comprising processing the set of signals to determine which of the set of signals has an alternative predetermined association with the reference signal and selecting, as a further optimum output, the signal which meets the alternative predetermined association.

32. A method according to claim 1 having the step of generating a second set of signals each associated with a differing state of the coherence between the reference signal and the carrier, the method further comprising processing the second set of signals to determine which of the second set of signals is associated with a current state of the coherence and selecting, as a second output, the signal of the second set which is determined to be associated.

33. A method according to claim 32 wherein the set of detected signals and the second set of signals in quadrature and the step of determining the signals uses signals of both sets.

34. A method according to claim 32 wherein the steps of selecting an output and selecting a second output are synchronised.

35. A method of processing a signal in a communications system, the method comprising the steps of:
receiving a modulated carrier signal from a transmission path;
generating a set of mutually related detection signals representing detections of the modulations for different amounts of phase or polarization slip by applying the received signal and a reference signal to a coupling network, the reference signal having phase or polarization slip relative to the carrier,
processing the set of signals to determine which of the set of signals is associated with a current state of the slip and,
based on this determination, selecting, as a current output, at least one of the set of detected signals.

36. A coherent receiver which is arranged to receive a signal from a transmission path, the receiver being arranged to coherently match the received modulated carrier and a reference signal, the reference signal having phase or polarization slip relative to the carrier, and to generate a set of mutually related signals, each associated with a differing state of the slip between the reference signal and the carrier,
a processing stage which is arranged to process the set of signals to determine which of the set of signals is associated with a current state of the slip between the reference signal and the carrier and based on this determination, select as a current output, at least one of the set of detected signals.

37. A coherent receiver arrangement comprising:
a first input port for receiving an input signal having data transmitted by modulating a carrier from a transmission path;

a second input port for receiving a reference signal, the reference signal having phase or polarization slip relative to the carrier;

a coupling network which is operable to coherently match the input signal and the reference signal to generate a set of mutually related signals, a processing stage which is arranged to process the set of signals to determine which of the set of signals is associated with a current state of the slip between the reference signal and the carrier and based on this determination, select as a current output, at least one of the set of detected signals.

38. A communications network incorporating a receiver according to claim 37.

* * * * *